United States Patent
Kim et al.

(10) Patent No.: US 10,776,491 B2
(45) Date of Patent: Sep. 15, 2020

(54) APPARATUS AND METHOD FOR COLLECTING AUDIT TRAIL IN VIRTUAL MACHINE BOOT PROCESS

(71) Applicant: ELECTRONICS AND TELECOMMUNICATIONS RESEARCH INSTITUTE, Daejeon (KR)

(72) Inventors: Sung-Jin Kim, Daejeon (KR); Hyunyi Yi, Incheon (KR); Seong-Joong Kim, Daejeon (KR); Woomin Hwang, Daejeon (KR); Byung-Joon Kim, Daejeon (KR); Chulwoo Lee, Daejeon (KR); Hyoung-Chun Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 170 days.

(21) Appl. No.: 15/938,017

(22) Filed: Mar. 28, 2018

(65) Prior Publication Data

US 2019/0012465 A1    Jan. 10, 2019

(30) Foreign Application Priority Data

Jul. 5, 2017    (KR) .................. 10-2017-0085441
Jul. 21, 2017   (KR) .................. 10-2017-0092551

(51) Int. Cl.
*G06F 21/55*    (2013.01)
*G06F 21/57*    (2013.01)
(Continued)

(52) U.S. Cl.
CPC ........ *G06F 21/575* (2013.01); *G06F 9/45533* (2013.01); *G06F 9/45558* (2013.01);
(Continued)

(58) Field of Classification Search
CPC ......... G06F 21/575; G06F 2009/45575; G06F 2009/45587; G06F 2009/45591;
(Continued)

(56) References Cited

U.S. PATENT DOCUMENTS 7,996,836 B1 * 8/2011 McCorkendale ....... G06F 21/53
                                                   713/164
9,202,053 B1 * 12/2015 Huang .................. G06F 21/566
(Continued)

FOREIGN PATENT DOCUMENTS

KR       10-1223594 B1     1/2013
KR       10-2014-0033349 A 3/2014

OTHER PUBLICATIONS

Andrei Bacs et al., "Slick: An Intrusion Detection System for Virtualized Storage Devices," Proceedings of the 31st Annual ACM Symposium on Applied Computing, Pisa, Italy, Apr. 4-8, 2016.
(Continued)

*Primary Examiner* — Olugbenga O Idowu
(74) *Attorney, Agent, or Firm* — LRK Patent Law Firm (57) ABSTRACT

An apparatus and method for collecting an audit trail in a virtual machine boot process, the audit-trail-collecting apparatus including an event detection unit for detecting a software interrupt event, a register state information extraction unit for extracting state information of a CPU register corresponding to a detection time of the software interrupt event, a monitoring unit for monitoring a change in a vector value corresponding to the software interrupt event in an interrupt vector table, a threat occurrence detection unit for detecting a threat occurrence in a virtual machine boot process based on at least one of the CPU register state information and a monitored result, and an audit trail collection unit for storing an audit trail corresponding to at least one of the CPU register state information and the monitored
(Continued)

result when the threat occurrence is detected in the virtual machine boot process.

18 Claims, 9 Drawing Sheets

(51) Int. Cl.
*G06F 9/455* (2018.01)
*G06F 21/53* (2013.01)
*G06F 21/56* (2013.01)

(52) U.S. Cl.
CPC ............ *G06F 21/53* (2013.01); *G06F 21/552* (2013.01); *G06F 21/554* (2013.01); *G06F 21/566* (2013.01); *G06F 2009/45575* (2013.01); *G06F 2009/45587* (2013.01); *G06F 2009/45591* (2013.01); *G06F 2221/034* (2013.01); *G06F 2221/2101* (2013.01)

(58) Field of Classification Search
CPC ...... G06F 21/53; G06F 21/552; G06F 21/554; G06F 21/566; G06F 2221/034; G06F 2221/2101; G06F 9/45533; G06F 9/45558; G06F 21/55
See application file for complete search history.

(56) References Cited

U.S. PATENT DOCUMENTS 9,251,343 B1 * 2/2016 Vincent ................. G06F 21/575
9,747,443 B2 8/2017 Sallam

OTHER PUBLICATIONS

Bernhard Grill et al., "A Practical Approach for Generic Bootkit Detection and Prevention," 7th EP Workshop, Apr. 16, 2014.
Young-Sang Shin "Trend of virtualization security technology based on hypervisor in a cloud environment," Journal of Korea Internet Security Agency, Jul. 2014, pp. 55-75.

* cited by examiner

APPARATUS AND METHOD FOR COLLECTING AUDIT TRAIL IN VIRTUAL MACHINE BOOT PROCESS

CROSS REFERENCE TO RELATED APPLICATIONS

This application claims the benefit of Korean Patent Application No. 10-2017-0085441, filed Jul. 5, 2017, and Korean Patent Application No. 10-2017-0092551, filed Jul. 21, 2017, which are hereby incorporated by reference in their entirety into this application.

BACKGROUND OF THE INVENTION

1. Technical Field

The present invention relates generally to an apparatus and method for collecting an audit trail in a virtual machine boot process, and more particularly, to a technology for recording in detail a threat in a virtual machine boot process based on a virtual machine introspection (VMI) technology.

2. Description of Related Art

A bootkit is a type of malicious code that infects a boot sector of a hard disk. When the boot sector is infected by the bootkit, a boot operation is executed by the bootkit without performing a normal boot process. In other words, the bootkit is loaded first, prior to security software, and thus bypasses various detection methods.

Typically, an anti-virus solution or host-based intrusion detection system (HIDS) solution provides a signature-based or behavior-based bootkit detection function. However, the signature-based detection scheme may not detect a bootkit having a new binary value.

The behavior-based detection scheme may monitor a disk access behavior to a system and detect a malicious bootloader modification. However, a carefully manufactured bootkit may discover a detection logic of a detection solution and bypass detection. In addition, the behavior-based detection scheme operates after system booting is completed, and thus may not monitor abnormal behavior of a bootkit, which occurs during a boot process.

Meanwhile, cloud computing provides a separate system layer for system virtualization. A layer called as a hypervisor or virtual machine monitor has an authority Ring-1 that is logically higher than Ring 0 in a protection domain of a computer system. Security technology using features of such a hypervisor area is classified as a technology of virtual machine introspection (VMI).

A VMI solution is not influenced by malicious code located inside a virtual machine and may safely monitor the inside of the virtual machine. In other words, in the virtual machine, it is not possible for malicious code acquiring an authority of Ring 0 to detect the presence of a hypervisor-based security solution having an authority of Ring-1, which exists outside the virtual machine.

Accordingly, it is desirable to develop a technology capable of disabling a detection bypass function of a bootkit based on a VMI technology and recording a threat occurring in a boot process.

In connection with this, Korean Patent Application Registration No. 10-1223594, (Date of publication: Jan. 17, 2013) discloses a technology related to "Real-time Operational Information Backup Method by Detecting LKM Rootkit and Recording Medium Thereof."

SUMMARY OF THE INVENTION

Accordingly, the present invention has been made keeping in mind the above problems occurring in the prior art, and an object of the present invention is to provide an apparatus and method for collecting an audit trail, wherein, in an Infrastructure as a Service (IaaS) environment, a virtual machine boot process is monitored in a hypervisor area, and a record of an intrusion occurring in the boot process is collected.

Another object of the present invention is to provide an apparatus and method for collecting an audit trail, wherein a disk read interrupt occurring at an initial boot time is monitored and a clue of an intrusion occurring in a boot process is recorded.

A further object of the present invention is to provide an apparatus and method for collecting an audit trail, wherein a detection-bypassing function of a bootkit is overcome and a threat of the bootkit, which operates prior to completion of system booting, is detected and an audit trail is collected.

Yet another object of the present invention is to provide an apparatus and method for collecting an audit trail, wherein a threat occurring in a boot process is accurately determined and recorded in order to prove a system intrusion by a bootkit.

Still another object of the present invention is to provide an apparatus and method for collecting an audit trail, wherein intrusion information (i.e. an audit trail) close to a time of occurrence of an intrusion in a virtual machine boot process may be provided.

In accordance with an aspect of the present invention to accomplish the above objects, there is provided an apparatus for collecting an audit trail in a virtual machine boot process, including an event detection unit for detecting a software interrupt event, a register state information extraction unit for extracting state information of a central processing unit (CPU) register, corresponding to a detection time of the software interrupt event, a monitoring unit for monitoring a change in a vector value corresponding to the software interrupt event in an interrupt vector table, a threat occurrence detection unit for detecting a threat occurrence in a virtual machine boot process based on at least one of the CPU register state information and a monitored result, and an audit trail collection unit for storing an audit trail corresponding to at least one of the CPU register state information and the monitored result when the threat occurrence is detected in the virtual machine boot process.

The register state information extraction unit may extract the CPU register state information including at least one of an access target sector number, a destination memory address and a CPU register value when the software interrupt event is an event corresponding to a disk read function.

The apparatus may further include a sector file mapping unit for acquiring mapping information in which a file corresponding to the access target sector number is mapped to an access target sector.

The threat occurrence detection unit may check call information of a bootloader using the access target sector number corresponding to the software interrupt event and the mapping information and detect the threat occurrence in the virtual boot process based on the call information of the bootloader.

The threat occurrence detection unit may determine whether the CPU register is in a normal state based on the CPU register state information, and when the CPU register is determined to be in a normal state, detect the threat occurrence in the virtual machine boot process based on the call information of the bootloader.

The threat occurrence detection unit may detect that injection of a malicious payload occurs when the access target sector is not a normal bootloader, and detect that an access to a non-allocation region occurs when the access target sector is not a normal bootloader and the sector region is the non-allocation region.

The threat occurrence detection unit may detect that a malicious service routine is registered by interrupt descriptor table hooking or a flag change when the monitored result is different from a log of a normal boot process and the CPU register state information.

The audit trail collection unit may dump at least one of a sector region corresponding to the access target sector number and a memory region corresponding to the destination memory address and store a dumped result as the audit trail when the threat occurrence in the virtual machine boot process is detected.

The event detection unit may detect the software interrupt event using at least one of a break point and a watch point registered before the virtual machine boot process.

The register state information extraction unit may extract the CPU register state information when the software interrupt event is a disk service software interrupt event (INT 13h) detected by the break point.

The monitoring unit may monitor the vector value change when the software interrupt event is an interrupt vector table change event detected by the watch point.

The threat occurrence detection unit may detect that BIOS interrupt hooking occurs when a time at which the vector table change occurs is different from a time corresponding to the log of the normal boot process.

In accordance with another aspect of the present invention to accomplish the above objects, there is provided a method for collecting an audit trail in a virtual machine boot process, the method being performed by an apparatus for collecting an audit trail in a virtual machine boot process, the method including detecting a software interrupt event, extracting CPU register state information corresponding to a time of detecting the software interrupt event, monitoring a change in a vector value corresponding to the software interrupt event in an interrupt vector table, detecting a threat occurrence in the virtual machine boot process based on at least one of the CPU register state information and a monitored result, and storing an audit trail corresponding to at least one of the CPU register state information and the monitored result when the threat occurrence in the virtual machine boot process is detected.

Extracting the CPU register state information may include extracting the CPU register state information including at least one of an access target sector number, a destination memory address, and a CPU register value when the software interrupt event corresponds to a disk read function.

The method may further include acquiring mapping information in which a file corresponding to the access target sector number is mapped to an access target sector.

Detecting the threat occurrence in the virtual machine boot process may include checking call information of a bootloader, using the access target sector number corresponding to the software interrupt event and the mapping information, and detecting the threat occurrence in the virtual machine boot process based on the call information of the bootloader.

Detecting the threat occurrence in the virtual machine boot process may include detecting that injection of a malicious payload occurs when the access target sector is not a normal bootloader, and detecting that an access to a non-allocation region occurs when the access target sector is not the normal bootloader and the sector region is the non-allocation region.

Storing the audit trail may include dumping at least one of a sector region corresponding to the access target sector number and a memory region corresponding to the destination memory address to store a dumped result as the audit trail when the threat occurrence in the virtual machine boot process is detected.

Detecting the threat occurrence in the virtual machine boot process may include detecting that BIOS interrupt hooking occurs when a time at which the vector table change occurs is different from a time corresponding to a log of a normal boot process.

Detecting the threat occurrence in the virtual machine boot process may include detecting that a malicious service routine is registered by interrupt descriptor table hooking or a flag change, when the monitored result is different from the log of the normal boot process and the CPU register state information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 1:
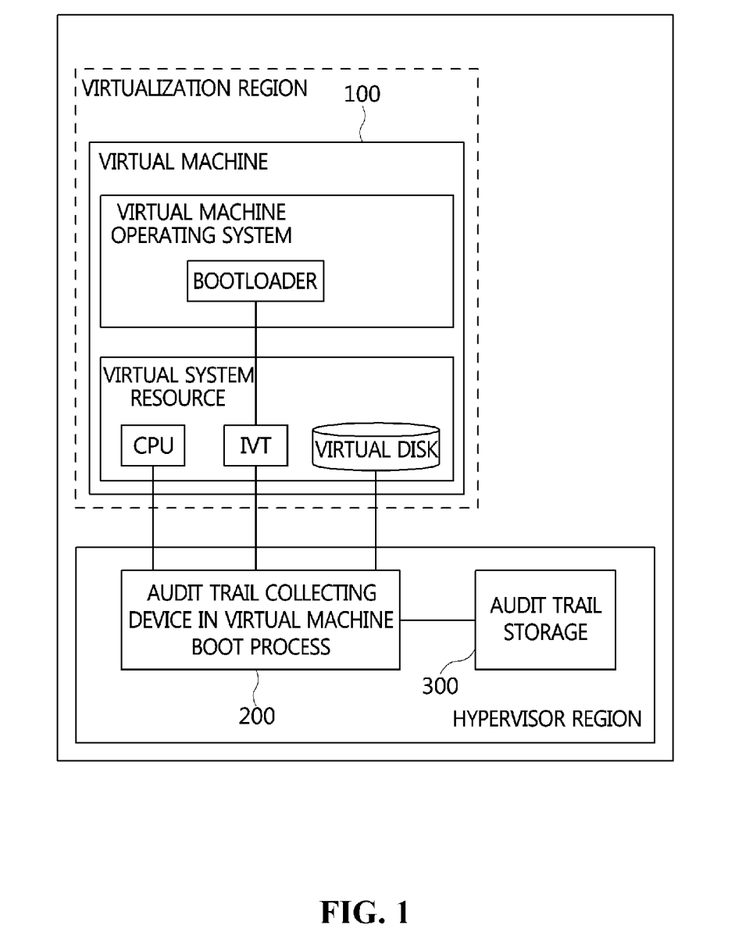
FIG. 1 schematically illustrates an environment to which an apparatus for collecting an audit trail in a virtual machine boot process is applied according to an embodiment of the present invention.

FIG. 1 schematically illustrates an environment to which an apparatus for collecting an audit trail in a virtual machine boot process is applied according to an embodiment of the present invention.

As illustrated in FIG. 1, an apparatus 200 for collecting an audit trail (hereinafter also referred to as an "audit-trail-collecting apparatus 200") in a virtual machine boot process is located in a hypervisor area of a physical host. The audit-trail-collecting apparatus 200 in the virtual machine boot process may detect access to a file that is not a normal bootloader or access to a non-allocation sector area based on a kind and sequence of a called bootloader in the boot process.

When a bootloader of the virtual machine 100 located in a virtualization area of the physical host generates a disk-related interrupt, the audit-trail-collecting apparatus 200 in the virtual machine boot process extracts information about a currently accessed sector with reference to a factor value of an interrupt function.

In addition, the audit-trail-collecting apparatus 200 in the virtual machine boot process may determine the kind of the currently loading bootloader by determining the file to which the corresponding sector belongs. Through this, the audit-trail-collecting apparatus 200 in the virtual machine boot process may find a call sequence of the bootloader.

Additionally, the audit-trail-collecting apparatus 200 in the virtual machine boot process may detect whether interrupt hooking occurs in the boot process by checking whether an interrupt vector table IVT is changed. In addition, the audit-trail-collecting apparatus 200 in the virtual machine boot process may detect a change in a central processing unit (CPU) register by checking a CPU register state for each boot stage.

The audit-trail-collecting apparatus 200 in the virtual machine boot process may detect a threat in a virtual machine boot process and record an audit trail corresponding to the detected threat based on at least one among the call sequence of the bootloader, whether the interrupt hooking occurs, and the CPU register state for each boot stage.

At this point, the audit-trail-collecting apparatus 200 in the virtual machine boot process may store the audit trail in an audit trail storage 300 located in the hypervisor area. For convenience of explanation, it has been described that the audit-trail-collecting apparatus 200 in the virtual machine boot process stores the audit trail in the audit trail storage 300 located in the hypervisor area, but the present invention is not limited thereto, and the audit-trail-collecting apparatus 200 in the virtual machine boot process may store the audit trail inside the physical host or a storage in the outside.

Hereinafter, a description will be provided of the configuration of the audit-trail-collecting apparatus 200 in the virtual machine boot process according to an embodiment of the present invention in relation to FIG. 2.

Figure 2:
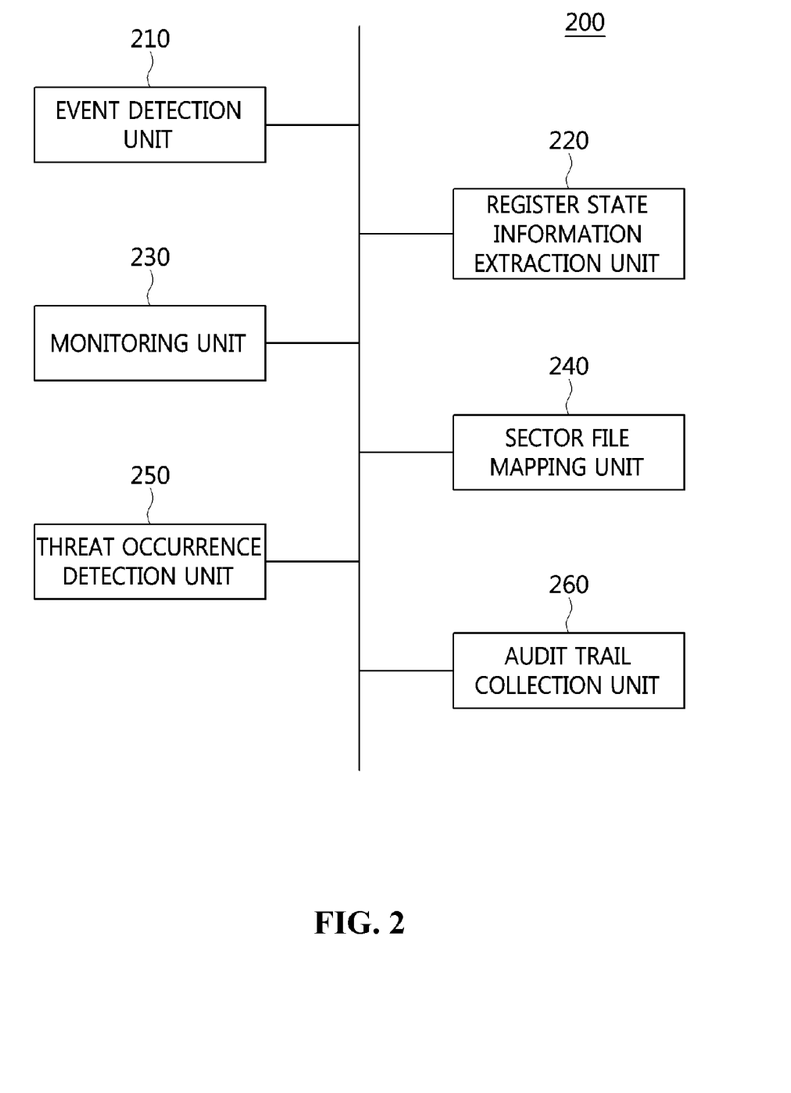
FIG. 2 is a block diagram illustrating a configuration of an audit-trail-collecting apparatus in a virtual machine boot process according to an embodiment of the present invention.

FIG. 2 is a block diagram illustrating the configuration of an audit-trail-collecting apparatus in the virtual machine boot process according to an embodiment of the present invention.

As illustrated in FIG. 2, the audit-trail-collecting apparatus 200 in the virtual machine boot process includes an event detection unit 210, a register state information extraction unit 220, a monitoring unit 230, a sector file mapping unit 240, a threat occurrence detection unit 250, and an audit trail collection unit 260.

First, the event detection unit 210 detects a software interrupt event. In order to find a system state of the bootloader for each stage, the event detection unit 210 may detect the occurrence time of the software interrupt event.

In addition, the event detection unit 210 may detect the software interrupt event using at least one of a breakpoint (BP) and a watch point (WP) registered before the virtual machine boot process.

At this point, the event detection unit 210 may detect a disk service software interrupt event, i.e. an INT 13h event, using the BP, and detect an interrupt vector table change event, i.e. a BIOS IVT change event.

The event detection unit 210 may be implemented by registering a software WP setting and processing routine using virtual machine debugging, or registering a hardware WP setting and processing routine through virtual machine monitor (VMM) system kernel correction. In addition, the event detection unit 210 may be implemented using a QEMU GDB server and a GDB client in a QEMU-KEM environment.

In addition, the event detection unit 210 may set a BP at an INT 13h vector address of a BIOS interrupt table and pass an execution flow at the time of break occurrence to a register state information extraction unit 220.

Then, the register state information extraction unit 220 extracts the CPU register state information corresponding to a detection time of the software interrupt event.

When the software interrupt event is a disk service software interrupt event INT 13h detected by the BP, the register state information extraction unit 220 may extract the CPU register state information.

At this point, the register state information extraction unit 220 may check whether a factor value of the detected software interrupt event INT 13h has a value of 42h, which is a disk read function, and, when determined to be an event corresponding to the disk read function, extract the CPU register state information.

Here, the CPU register state information may include at least one of an access target sector number, a destination memory address, and a CPU register value.

The register state information extraction unit 220 checks whether a function indicated by an AH register value is a disk read function 42h (i.e. Extended Read Sectors from Drive). When the function indicated by the AH register value is a disk read function 42h, the register state information extraction unit 220 checks a memory address indicated by the corresponding value with reference to DS (i.e. Segment) and SI (i.e. Offset) register values, and checks a disk address packet (DAP) value corresponding to the corresponding memory address.

Furthermore, the register state information extraction unit 220 parses the DAP value, and extracts a disk sector number (i.e. an access target sector number) to which access is currently desired, and logs the extracted disk sector number and a copy target memory address.

In addition, the register state information extraction unit 220 may extract and log a CPU register value including at least one value of a control register (CR), a debug register (DR) and an EFLAG register.

Additionally, the monitoring unit 230 monitors a vector value corresponding to the software interrupt event in an interrupt vector table (IVT). Here, the vector value has a [segment:offset] type, and when the vector value is changed, the monitoring unit 230 records the change as a log.

In particular, when the software interrupt event is an interrupt vector table change event (i.e. BIOS IVT change event) detected by the WP, the monitoring unit 230 may monitor a change in a vector value.

The monitoring unit 230 may be implemented by registering a software WP setting and processing routine using virtual machine debugging or by registering a hardware WP setting and processing routine through virtual machine monitor (VMM) system kernel correction. In addition, the monitoring unit 230 may be implemented using a QEMU GDB server and a GDB client in a QEMU-KEM environment.

Next, the sector file mapping unit 240 acquires mapping information of a sector file to find the file to which an access target sector value corresponding to the extracted access target sector number corresponds. At this point, the sector file mapping unit 240 may parse metadata information of a virtual disk to acquire the mapping information.

Further, the sector file mapping unit 240 may integrate and store the mapping information and CPU register state information extracted by the register state information extraction unit 220.

The threat occurrence detection unit 250 detects a threat occurrence in a virtual machine boot process based on at least one of the CPU register state information and a monitored result.

The threat occurrence detection unit 250 may detect whether a threat occurs in the virtual machine boot process based on at least one of a call sequence of the bootloader, a CPU register state for each boot stage, and whether interrupt hooking occurs in the boot process. In addition, when the threat is detected, the threat occurrence detection unit 250 records the threat in the virtual machine boot process.

At this point, the threat occurrence detection unit 250 may check call information of the bootloader using an access target sector number and mapping information corresponding to the software interrupt event, and may detect the occurrence of the threat in the virtual machine boot process based on the call information of the bootloader.

In addition, the threat occurrence detection unit 250 may determine whether the CPU register is in a normal state based on the CPU register state information, and when the CPU register is determined to be in a normal state, detect the occurrence of the threat in the virtual machine boot process based on the call information of the bootloader.

The threat occurrence detection unit 250 may compare the monitored result with the log and CPU register state information in a normal boot process, and when the monitored result is determined to be different from the result (i.e. the log and CPU register state information) of the normal boot process, detect that a malicious service routine, which is caused by interrupt descriptor table hooking or a flag change, is registered.

Furthermore, when the access target sector is not a normal bootloader, the threat occurrence detection unit 250 may detect that injection of a malicious payload has occurred. Furthermore, when the access target sector is not a normal bootloader and a sector region is a non-allocation region, the threat occurrence detection unit 250 may detect that access to the non-allocation region has occurred.

When the time at which a vector table change occurs is different from a time corresponding to the log of the normal boot process, the threat occurrence detection unit 250 may detect that BIOS interrupt hooking occurs.

Finally, when the threat is detected in the virtual machine boot process, the audit trail collection unit 260 stores an audit trail corresponding to at least one of the CPU register state information and the monitored result.

When the threat is detected to occur in the virtual machine boot process, the audit trail collection unit 260 may dump at least one of a sector region corresponding to the access target sector number and a memory region corresponding to a destination memory address and store the same as the audit trail.

Hereinafter, a description will be provided in detail of a method for collecting an audit trail performed by the audit-trail-collecting apparatus in a virtual machine boot process according to an embodiment of the present invention in relation to FIGS. 3 and 4.

Figure 3:
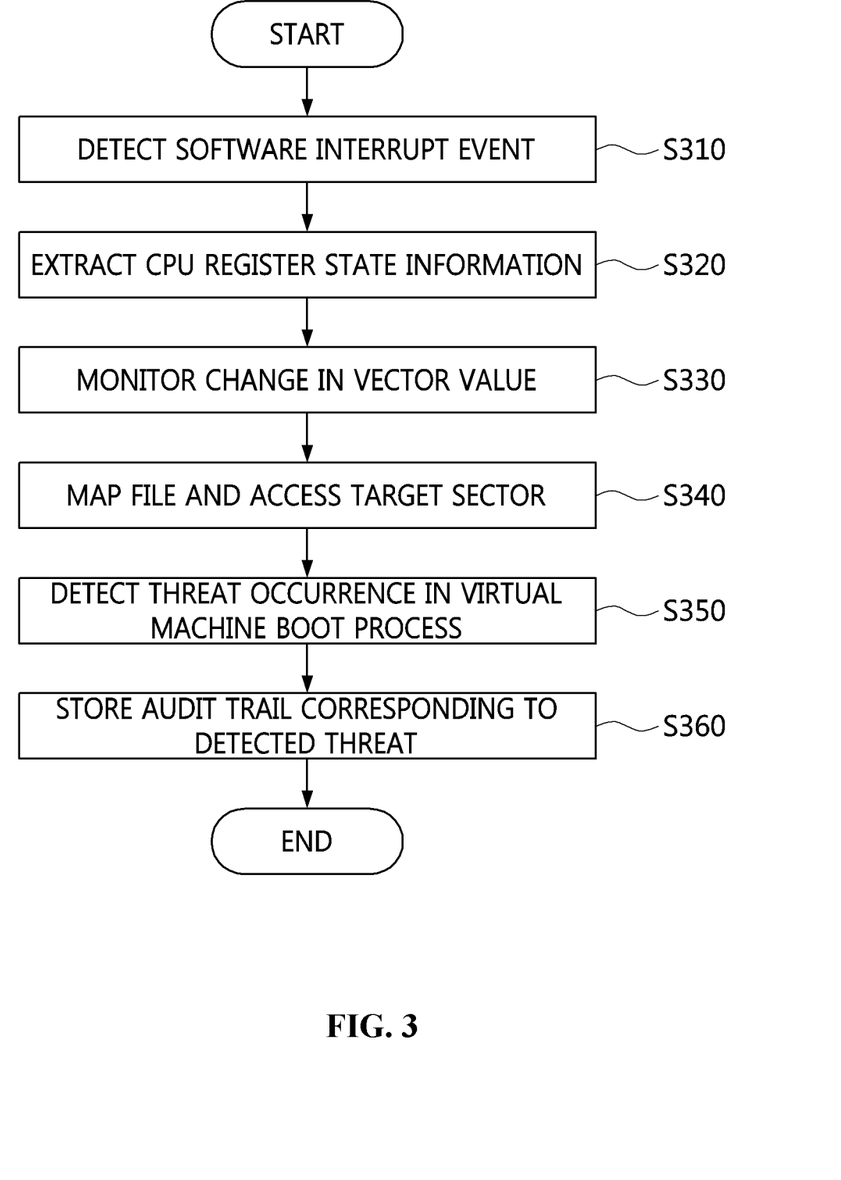
FIG. 3 is a flowchart for explaining a method for collecting an audit trail in a virtual machine boot process according to an embodiment of the present invention.
Figure 4:
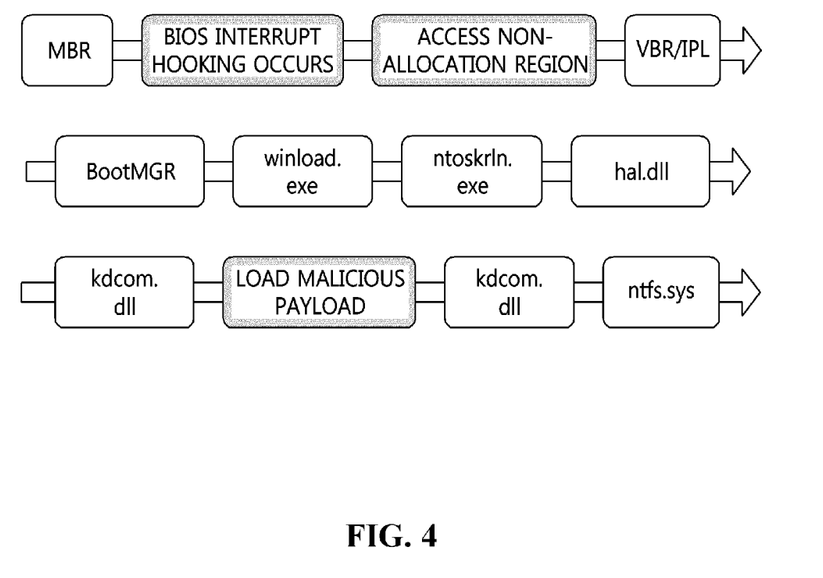
FIG. 4 is a drawing for explaining an intrusion inspection summary report generated by storing an audit trail at step S360 of FIG. 3.

FIG. 3 is a flowchart for explaining a method for collecting an audit trail in a virtual machine boot process according to an embodiment of the present invention, and FIG. 4 is a drawing for explaining an intrusion inspection summary report generated by storing an audit trail at step S360 of FIG. 3.

First, the audit-trail-collecting apparatus 200 in the virtual machine boot process detects a software interrupt event at step S310.

The audit-trail-collecting apparatus 200 in the virtual machine boot process detects the software interrupt event generated by a bootloader of the virtual machine. At this point, the audit-trail-collecting apparatus 200 in the virtual machine boot process may detect the software interrupt event including at least one of a disk service software interrupt event (i.e. a NIT 13h event) and an interrupt vector table change event (i.e. a BIOS IVT change event).

In addition, the audit-trail-collecting apparatus 200 in the virtual machine boot process may detect the software interrupt event using at least one of a BP and WP registered before the virtual machine booting process.

Then, the audit-trail-collecting apparatus 200 in the virtual machine boot process extracts CPU register state information at step S320.

When an AH register value at the time at which the software interrupt event is detected is a value corresponding to a disk read function 42h, the audit-trail-collecting apparatus 200 in the virtual machine boot process checks the memory address indicated by the corresponding value with reference to DS and SI register values. Also, the audit-trail-collecting apparatus 200 in the virtual machine boot process checks a DAP value corresponding to the corresponding memory address.

The audit-trail-collecting apparatus 200 in the virtual machine boot process parses the DAP value to extract an access target sector number desired to be currently accessed, and logs the extracted access target sector number and the destination memory address.

In addition, the audit-trail-collecting apparatus 200 may extract and log a CPU register value including at least one of CR, DR and EFLAGS register values.

Then, the audit-trail-collecting apparatus 200 in the virtual machine boot process monitors a vector value change at step S330.

The audit-trail-collecting apparatus 200 in the virtual machine boot process monitors a vector value change corresponding to the INT 13h event in the BIOS interrupt vector table. Then, when the vector value change occurs, the audit-trail-collecting apparatus 200 in the virtual machine boot process logs the vector value at step S330.

In addition, the audit-trail-collecting apparatus 200 in the virtual machine boot process acquires mapping information between a file and an access target sector at step S340.

The audit-trail-collecting apparatus 200 in the virtual machine boot process acquires the mapping information to find the file to which the access target sector value corresponding to the access target sector number corresponds.

At this point, the audit-trail-collecting apparatus 200 in the virtual machine boot process may parse metadata information of the virtual disk so as to acquire sector-file mapping information. Then, the audit-trail-collecting apparatus 200 in the virtual machine boot process may integrate the acquired mapping information and CPU register state information.

In addition, the audit-trail-collecting apparatus 200 in the virtual machine boot process detects occurrence of a threat in the virtual machine boot process at step S350.

The audit-trail-collecting apparatus 200 in the virtual machine boot process may detect an abnormality in the virtual machine boot process and determine whether a threat occurs based on the results of steps S320 and S330. At this point, the audit-trail-collecting apparatus 200 in the virtual machine boot process may detect the abnormality using a result log in a pre-stored normal boot process.

In addition, the audit-trail-collecting apparatus 200 in the virtual machine boot process may compare the CPU register state information extracted at step S320 and the result log of the normal boot process, and when the compared result is determined to be different, detect that a malicious service routine caused by IDT hooking or a flag change is registered.

Also, when a disk sector region read by a BIOS interrupt is not included in the result log of the normal boot process, the audit-trail-collecting apparatus 200 in the virtual machine boot process may detect that a malicious payload is loaded.

The audit-trail-collecting apparatus 200 in the virtual machine boot process may detect an intrusion accident in the virtual machine boot process based on a kind and sequence of a called boot loader in the boot process. At this point, the audit-trail-collecting apparatus 200 in the virtual machine boot process may check the call information of the bootloader using the mapping information at step 340, and may detect that access to a non-allocation region or injection of a malicious payload occurs based on the call information of the bootloader.

In addition, when the IVT change occurrence time corresponding to the monitored result at step S330 is different from the resultant log generation time of the normal boot process, the audit-trail-collecting apparatus 200 in the virtual machine boot process may detect that the BIOS interrupt hooking is registered.

Finally, the audit-trail-collecting apparatus 200 in the virtual machine boot process stores the audit trail corresponding to the detected threat at step S360.

Also, the audit-trail-collecting apparatus 200 in the virtual machine boot process may generate, as in FIG. 4, an accident inspection summary report in the virtual machine booting process based on the CPU register state information extracted at step S320, the monitored result at step S330, and the abnormality (i.e. threat) detected at step S350.

Hereinafter, in relation to FIGS. 5 and 6, a detailed description will be provided of BIOS interrupt execution flows in the normal state and in the interrupt hooking state by a bootkit.

Figure 5:
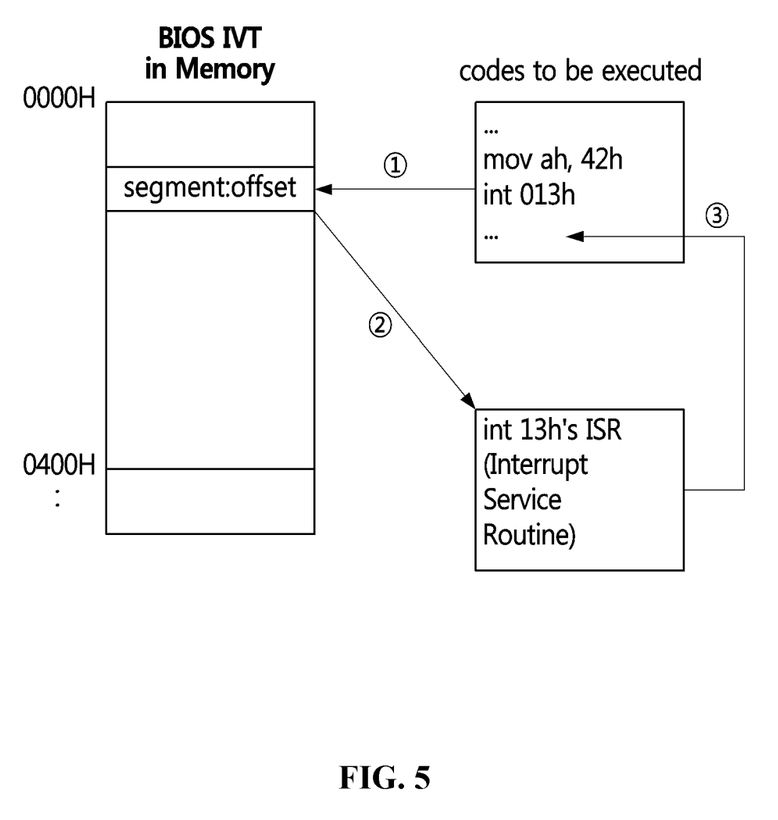
FIG. 5 is a drawing indicating a BIOS interrupt execution flow in a normal state.
Figure 6:
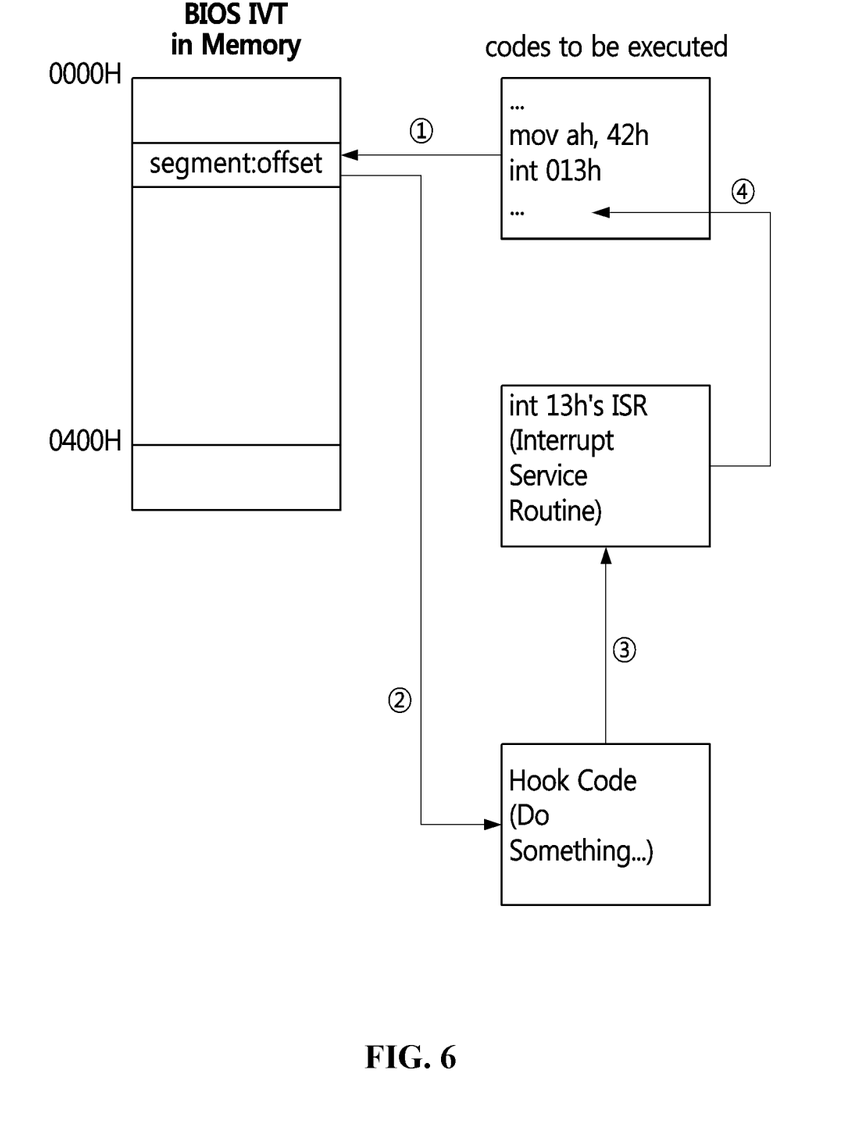
FIG. 6 is a drawing indicating a BIOS interrupt execution flow when BIOS interrupt hooking occurs.

FIG. 5 is a drawing indicating the BIOS interrupt execution flow in the normal state, and FIG. 6 is a drawing indicating the BIOS interrupt execution flow when the BIOS interrupt hooking occurs.

As illustrated in FIG. 5, in case of the normal state, when a CPU executes an INT 13h instruction of the bootloader code, a system refers to a BIOS IVT in memory. In the BIOS IVT, a vector value indicating the start address of an interrupt service routine is recorded in a type [segment: offset], and the system may jump to the start address of the interrupt service routine in reference to the vector value. Also, the interrupt service routine performs a disk service according to a factor value of the INT 13h instruction, and returns the execution flow to the bootloader.

On the other hand, when infected by the bootkit and performing the interrupt hooking, the BIOS interrupt execution flow is as illustrated in FIG. 6.

As illustrated in FIG. 6, when the CPU executes the INT 13h instruction of the bootloader, the system refers to a BIOS interrupt vector table in the memory. When infected by the bootkit, a start address vector value of a malicious hooking code, not the start address of the interrupt service routine, is recorded in the BIOS interrupt vector table.

The malicious hooking code executes a malicious activity such as injection of a malicious driver in the boot process, and then jumps to the normal interrupt service routine. Also, the interrupt service routine performs the disk service according to a factor value of the 13h instruction, and returns the execution flow to the bootloader.

As illustrated in FIG. 6, the bootkit induces the operating system to load a malicious driver at a specific time based on a BIOS interrupt hooking scheme. Using this property, the audit-trail-collecting apparatus 200 in the virtual machine boot process according to an embodiment of the present invention may detect an intrusion accident in the boot process based on whether the interrupt hooking occurs in the boot process.

Also, the bootkit accesses a file or a non-allocation sector region, not the normal bootloader. Using this property, the audit-trail-collecting apparatus 200 in the virtual machine boot process according to an embodiment of the present invention may detect an intrusion accident in the boot process on the basis the a kind and sequence the bootloader.

In order to acquire execution flow in the boot process other than the BIOS interrupt hooking, the bootkit uses an interrupt descriptor table (IDT) hooking scheme. The IDT hooking is similar to the BIOS interrupt hooking scheme, but there is a difference in that the IVT is used in a real mode but the IDT is used in a protection mode.

When the bootkit hooks the INT 1h, a target memory address is input to a debug register of the CPU. Also, a new INT 1h vector value and a malicious interrupt service routine are registered. At this point, the audit-trail-collecting apparatus 200 in the virtual machine boot process according to an embodiment of the present invention may check whether the CPU debug register value is changed and detect an intrusion accident in the boot process.

In order to disrupt the execution flow of the boot process, the bootkit may perform EFLAGS register setting to maliciously generate a trap. In addition, the case where the debug register is set in the boot process is typically unusual. Accordingly, the audit-trail-collecting apparatus 200 in the virtual machine boot process according to an embodiment of the present invention may check a state change of a CPU register and detect an intrusion accident in the boot process.

In other words, the audit-trail-collecting apparatus 200 in the virtual machine boot process according to an embodiment of the present invention executes the process of FIG. 3 to detect whether a threat occurs in the virtual machine boot process based on at least one of whether the interrupt hooking occurs in the boot process, a call sequence of the bootloader, and the CPU register state for each boot stage.

Hereinafter, a detailed description will be provided about a configuration of an audit-trail-collecting apparatus in a virtual machine boot process according to an embodiment of the present invention in relation to FIG. 7.

Figure 7:
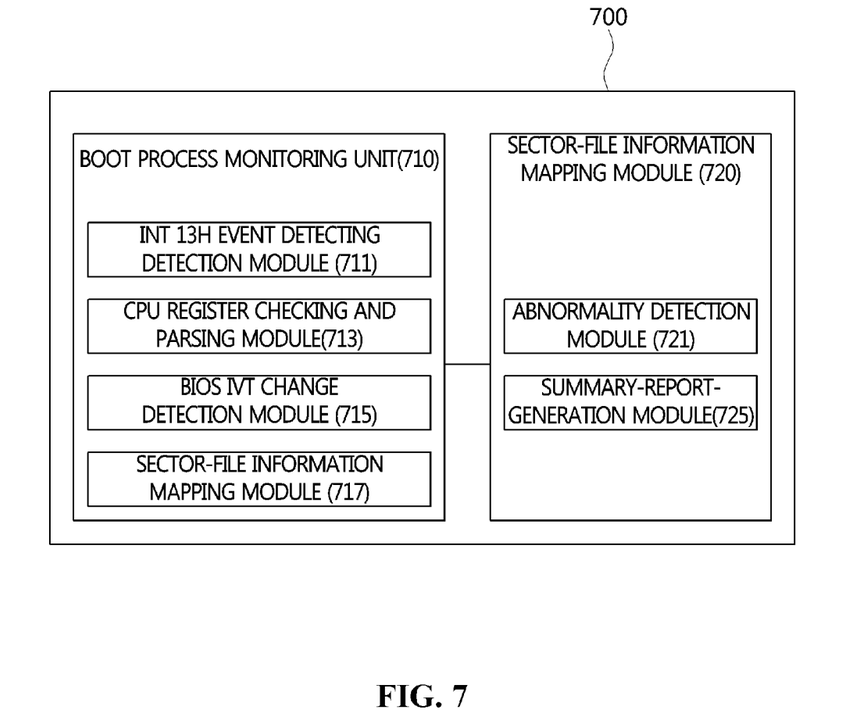
FIG. 7 is a block diagram illustrating a configuration of an audit-trail-collecting apparatus in a virtual machine boot process according to another embodiment of the present invention.

FIG. 7 is a block diagram illustrating a configuration of an audit-trail-collecting apparatus in a virtual machine boot process according to another embodiment of the present invention.

As illustrated in FIG. 7, the audit-trail-collecting apparatus 700 in the virtual machine boot process may include a boot process monitoring unit 710 and a summary-report-generation unit 720. Also, the boot process monitoring unit 710 may include an INT 13h event detection module 711, a CPU register checking and parsing module 713, a BIOS IVT change detection module 715, and a sector-file information mapping module 717.

Here, the INT 13h event detection module 711 is substantially identical to the event detection unit 210 of FIG. 2, the CPU register detecting and parsing module 713 is substantially to the register state information extraction unit 220 of FIG. 2, and the BIOS IVT change detection module 715 and the sector-file information mapping module 717 are respectively substantially identical to the monitoring unit 230 and the sector file mapping unit 240 of FIG. 2.

Also, a summary-report-generation unit 720 may include an abnormality detection module 721 and a summary-report-generation module 725, and the abnormality detection module 721 and the summary-report-generation module 725 are respectively substantially identical to the threat occurrence detection unit 250 and the audit trail collection unit 260 of FIG. 2, and thus repetitive descriptions thereof will be omitted.

Figure 8:
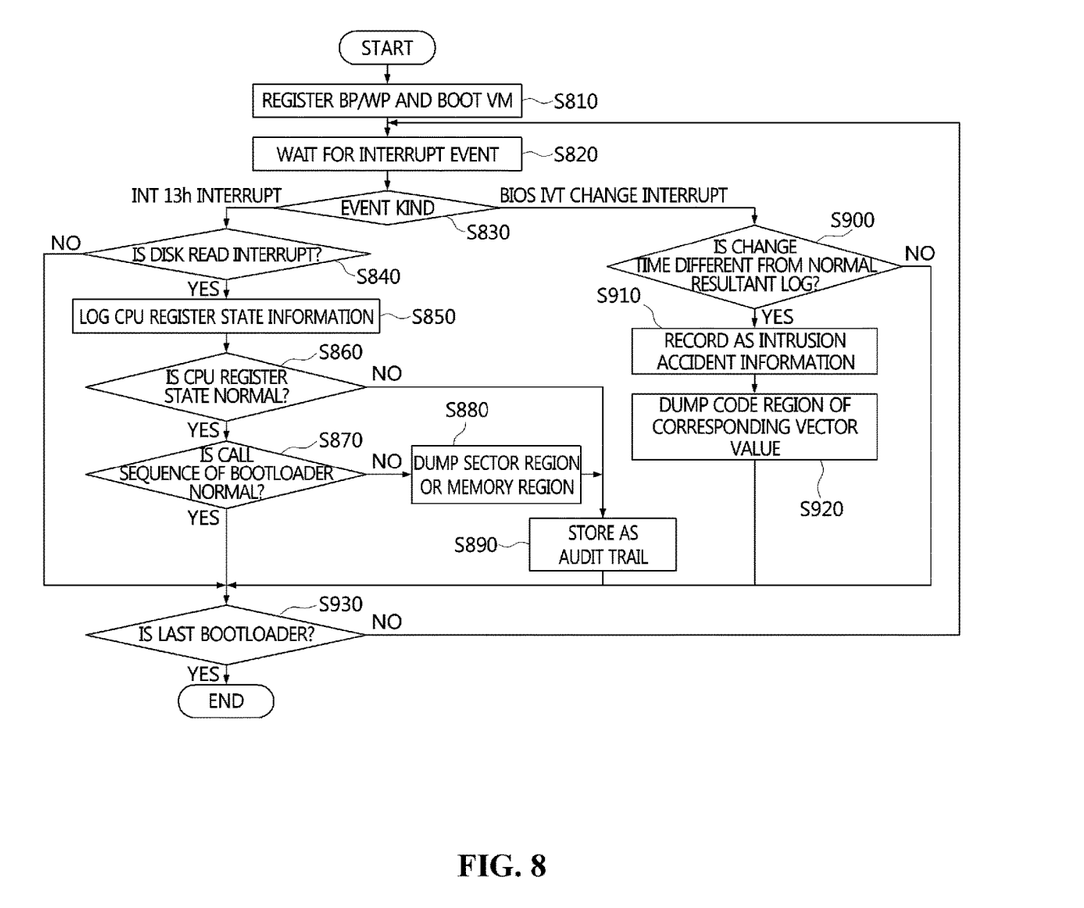
FIG. 8 is a flowchart for explaining a process of recording, by an audit-trail-collecting apparatus, intrusion accident information in a virtual machine boot process according to an embodiment of the present invention.

Hereinafter, a more detailed description will be provided of a method for collecting an audit trail executed by the audit-trail-collecting apparatus in a virtual machine boot process according to another embodiment of the present invention.

FIG. 8 is a flowchart for explaining a process in which the audit-trail-collecting apparatus in the virtual machine boot process according to an embodiment of the present invention records intrusion accident information.

As illustrated in FIG. 8, the audit-trail-collecting apparatus 700 in the virtual machine boot process registers a BP and WP, and boots a virtual machine at step S810. In addition, the audit-trail-collecting apparatus 700 in the virtual machine boot process waits for an interrupt event at step S820.

The audit-trail-collecting apparatus 700 in the virtual machine boot process may register the BP and WP so as to detect an INT 13h event and a BIOS IVT change event.

At this point, the audit-trail-collecting apparatus 700 in the virtual machine boot process may register the BP to an interrupt service routing start address of the INT 13h, and may register the WP to an INT 13h vector of the BIOS interrupt vector table. The setting positions to which the BP and WP are registered may be set differently depending on the kind of interrupt hooked by the bootkit.

In addition, the audit-trail-collecting apparatus 700 in the virtual machine boot process executes the virtual machine to proceed to the boot process. Upon starting the boot process, the audit-trail-collecting apparatus 700 in the virtual machine boot process waits for the INT 13h event and BIOS IVT change event according to the registered BP and WP.

Then, the audit-trail-collecting apparatus 700 in the virtual machine boot process distinguishes the kind of an occurring event at step S830, and detects a threat occurrence in the virtual machine boot process according to the event kind.

When an INT 13h instruction is executed, the virtual machine is temporarily stopped by the BP registered at step S810. In addition, the audit-trail-collecting apparatus 700 in the virtual machine boot process checks whether this is caused by a disk read interrupt at step S840.

When the INT 13h factor value is not a value of 42h, which corresponds to a disk read function, the audit-trail-collecting apparatus 700 in the virtual machine boot process may execute step S930, to be described later, check whether a currently called bootloader is a bootloader using a BIOS interrupt in a last step, and when the bootloader is not at the last step, execute step S820 again.

On the other hand, when the INT 13h factor value is the 42h value of the disk read function, the audit-trail-collecting apparatus 700 in the virtual machine boot process logs the CPU register state information at step S850.

The audit-trail-collecting apparatus 700 in the virtual machine boot process may log an access sector number, a destination memory address, and a CPU register value, but otherwise, step S850 is substantially similar to step S320 of FIG. 3, and thus a repetitive description thereof will be omitted.

Also, the audit-trail-collecting apparatus 700 in the virtual machine boot process determines whether the CPU register state is normal at step S860.

The audit-trail-collecting apparatus 700 in the virtual machine boot process compares CPU register state information logged at step S850 with CPU register state information of a pre-stored resultant log of the normal boot process.

As a comparison result, when the two pieces of CPU register state information are determined to be different, the audit-trail-collecting apparatus 700 in the virtual machine boot process determines that the CPU register state is not normal at step S860 (NO), executes step S890, to be described later, and records intrusion accident information.

On the other hand, when the two pieces of CPU register state information are determined to be identical, the audit-trail-collecting apparatus 700 in the virtual machine boot process determines that the CPU register state is normal at step S860 (YES) and determines whether a call sequence is normal at step S870.

At this point, the audit-trail-collecting apparatus 700 in the virtual machine boot process may determine whether the call sequence of the bootloader is normal based on the access sector number, which is an interrupt instruction factor value, and the sector-file mapping information.

When the call sequence of the bootloader is not determined to be normal at step S870 (NO), the audit-trail-collecting apparatus 700 in the virtual machine boot process dumps at least one of a sector region corresponding to the access target sector number and a memory region corresponding to the destination memory address at step S880, and stores the same as an audit trail at step S890.

At this point, when the sector region accessed by the access target sector is a non-allocation region of a file system, the audit-trail-collecting apparatus 700 in the virtual machine boot process may store the intrusion accident information (i.e. audit trail) as a non-allocation region access. On the other hand, when not the non-allocation region, the audit-trail-collecting apparatus 700 in the virtual machine boot process may store the intrusion accident information as the injection of a malicious payload.

In addition, when the CPU register state is not determined to be normal at step S860, the audit-trail-collecting apparatus 700 in the virtual machine boot process may record the intrusion accident information as an abnormal CPU register state through step S890.

In addition, when the INT 13h factor value is not determined to be a value of 42h, which is the disk read function, at step S840, or the call sequence of the bootloader is determined to be normal at step S870, the audit-trail-collecting apparatus 700 in the virtual machine boot process may not store the audit trail, but may perform step S930 to be described later.

On the other hand, when the event detected at step S830 is the BIOS IVT change event, the audit-trail-collecting apparatus 700 in the virtual machine boot process compares a change time with a resultant log of the normal booting process to determine whether the change time and the resultant log in the normal boot process are different at step S900.

Also, when the change time and the resultant log in the normal boot process are different at step S900 (YES), the audit-trail-collecting apparatus 700 in the virtual machine boot process records intrusion accident information indicating that BIO interrupt hooking occurs at step S910, and dumps a code region indicated by the changed vector value to memory at step S920.

When step S920 is performed or when the change time and the resultant log in the normal boot process are determined to be identical at step S900, the audit-trail-collecting apparatus 700 in the virtual machine boot process performs step S930 to perform the boot process.

Finally, the audit-trail-collecting apparatus 700 in the virtual machine boot process may check whether a currently called bootloader is a final stage bootloader using the BIOS interrupt at step S930.

At this point, when the currently called bootloader is determined to be the final stage bootloader using the BIOS interrupt, the audit-trail-collecting apparatus 700 in the virtual machine boot process may end the audit trail collection process. On the other hand, when not determined to be the final stage, the audit-trail-collecting apparatus 700 in the virtual machine boot process performs step S820 again to wait for the occurrence of the interrupt event.

Each time the interrupt event occurs while booting is underway, the audit-trail-collecting apparatus 700 in the virtual machine boot process may repeat steps S820 to S930.

Figure 9:
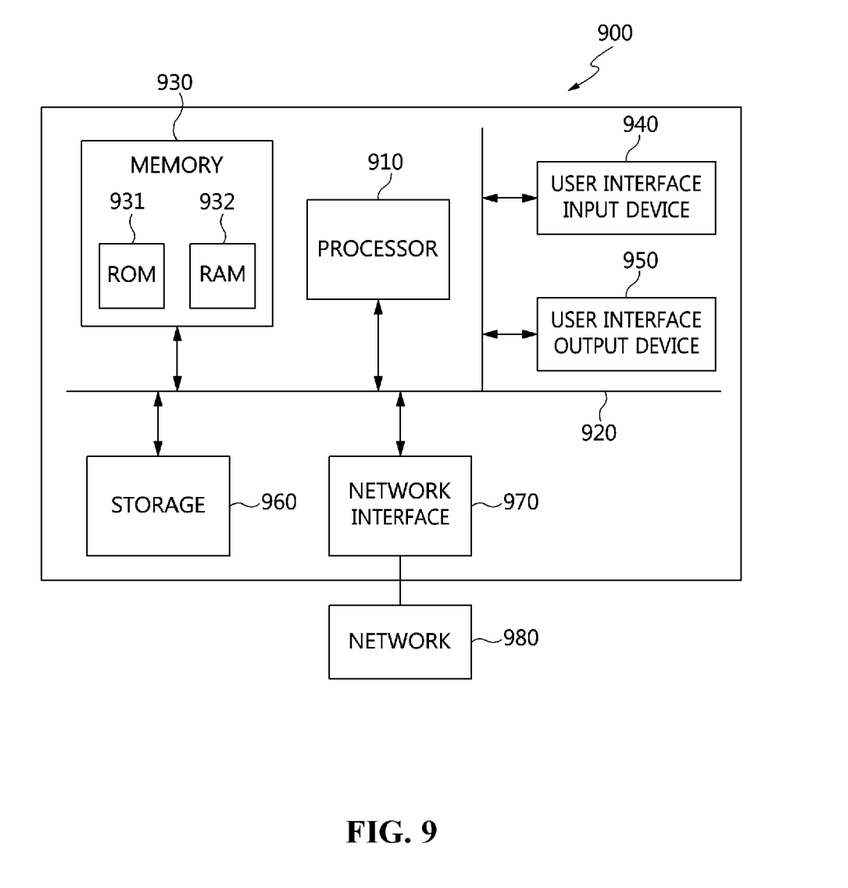
FIG. 9 is a block diagram illustrating a computer system according to an embodiment of the present invention.

FIG. 9 is a block diagram illustrating a computer system according to an embodiment of the present invention.

Referring to FIG. 9, the embodiment of the present invention may be implemented in a computer system 900 such as a computer-readable storage medium. As illustrated in FIG. 9, the computer system 900 may include one or more processors 910, memory 930, a user interface input device 940, a user interface output device 950, and storage 960, which communicate with each other through a bus 920. The computer system 900 may further include a network interface 970 connected to a network 980. Each processor 910 may be a Central Processing Unit (CPU) or a semiconductor device for executing processing instructions stored in the memory 930 or the storage 960. Each of the memory 930 and the storage 960 may be any of various types of volatile or nonvolatile storage media. For example, the memory 930 may include Read-Only Memory (ROM) 931 or Random Access Memory (RAM) 932.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

In accordance with the present invention, a record of an intrusion occurring in the boot process may be collected by monitoring a virtual machine boot process in a hypervisor area.

In accordance with the present invention, a clue of an intrusion accident occurring in a boot process may be recorded by monitoring a disk read interrupt occurring at an initial boot time.

In accordance with the present invention, a detection-bypassing function of a bootkit may be overcome and a threat of the bootkit, which operates prior to completion of system booting, is detected and an audit trail may be collected.

In accordance with the present invention, a threat occurring in a boot process is accurately determined and recorded in order to prove a system intrusion by a bootkit.

In accordance with the present invention, intrusion information (i.e. an audit trail) near the time of occurrence of an intrusion, which occurs in a virtual machine boot process, may be provided.

As described above, in the apparatus and method for collecting an audit trail in a virtual machine boot process according to the present invention, the configurations and schemes in the above-described embodiments are not limitedly applied, and some or all of the above embodiments can be selectively combined and configured such that various modifications are possible.

What is claimed is:

1. An apparatus for collecting an audit trail in a boot process of a virtual machine, the apparatus comprising:
an event detection unit for detecting a software interrupt event generated by a bootloader of the virtual machine;
a register state information extraction unit for extracting state information of a central processing unit (CPU) register, corresponding to a detection time of the software interrupt event;

a monitoring unit for monitoring a change of a vector value corresponding to the software interrupt event in an interrupt vector table;

a threat occurrence detection unit for detecting a threat occurrence in a virtual machine boot process based on at least one of the CPU register state information and the monitored result; and an audit trail collection unit for storing an audit trail corresponding to at least one of the CPU register state information and the monitored result when the threat occurrence is detected in the virtual machine boot process, wherein in a case where the software interrupt event is an event corresponding to a disk read function, the register state information extraction unit extracts the CPU register state information comprising an access target sector number, a destination memory address, and a CPU register value including a control register value, a debug register value and an EFLAGS register value.

2. The apparatus of claim 1, further comprising a sector-file mapping unit for acquiring sector-file mapping information about which file is mapped to an access target sector corresponding to the access target sector number.

3. The apparatus of claim 2, wherein the threat occurrence detection unit checks call information of the bootloader using the access target sector number and the sector-file mapping information, which correspond to the software interrupt event, and detects the threat occurrence in the virtual boot process based on the call information of the bootloader.

4. The apparatus of claim 3, wherein the threat occurrence detection unit determines whether the CPU register is in a normal state based on the CPU register state information, and wherein after the CPU register is determined by the threat occurrence detection unit to be in the normal state, the threat occurrence detection unit performs detection of the threat occurrence in the virtual machine boot process based on the call information of the bootloader.

5. The apparatus of claim 4, wherein the threat occurrence detection unit detects that injection of a malicious payload occurs, when the access target sector is not a normal bootloader, and wherein the threat occurrence detection unit detects that an access to a non-allocation region occurs, when the access target sector is not a normal bootloader and the sector region is the non-allocation region.

6. The apparatus of claim 5, wherein the threat occurrence detection unit detects that a malicious service routine is registered due to an interrupt descriptor table hooking or a flag change, when the monitored result is different from a log of a normal boot process and the CPU register state information.

7. The apparatus of claim 6, wherein the audit trail collection unit dumps at least one of a sector region corresponding to the access target sector number and a memory region corresponding to the destination memory address and stores a dumped result as the audit trail, when the threat occurrence in the virtual machine boot process is detected.

8. The apparatus of claim 1, wherein the event detection unit detects the software interrupt event using at least one of a break point and a watch point, which are registered before the virtual machine boot process.

9. The apparatus of claim 8, wherein the register state information extraction unit extracts the CPU register state information, when the software interrupt event is a disk service software interrupt event (INT 13h) detected by the break point.

10. The apparatus of claim 8, wherein the monitoring unit monitors the vector value change, when the software interrupt event is an interrupt vector table change event detected by the watch point.

11. The apparatus of claim 10, wherein the threat occurrence detection unit detects that BIOS interrupt hooking occurs, when a time at which the vector table change occurs is different from a time corresponding to the log of the normal boot process.

12. A method for collecting an audit trail in a boot process of a virtual machine, the method being performed by an apparatus for collecting an audit trail in the virtual machine boot process and comprising:

detecting a software interrupt event generated by a bootloader of the virtual machine;

extracting CPU register state information corresponding to a time of detecting the software interrupt event;

monitoring a change of a vector value corresponding to the software interrupt event in an interrupt vector table;

detecting a threat occurrence in the virtual machine boot process based on at least one of the CPU register state information and the monitored result; and storing an audit trail corresponding to at least one of the CPU register state information and the monitored result when the threat occurrence in the virtual machine boot process is detected, wherein in a case where the software interrupt event is an event corresponding to a disk read function, the extracting the CPU register state information comprises extracting the CPU register state information comprising an access target sector number, a destination memory address, and a CPU register value including a control register value, a debug register value and an EFLAGS register value.

13. The method of claim 12, further comprising acquiring sector-file mapping information about which file is mapped to an access target sector corresponding to the access target sector number.

14. The method of claim 13, wherein the detecting the threat occurrence in the virtual machine boot process comprises:

checking call information of the bootloader using the access target sector number and the mapping information, which correspond to the software interrupt event, and detecting the threat occurrence in the virtual machine boot process based on the call information of the bootloader.

15. The method of claim 14, wherein the detecting the threat occurrence in the virtual machine boot process comprises:

detecting that injection of a malicious payload occurs, when the access target sector is not a normal bootloader, and detecting that an access to a non-allocation region occurs, when the access target sector is not the normal bootloader and the sector region is the non-allocation region.

16. The method of claim 15, wherein the storing the audit trail comprises dumping at least one of a sector region corresponding to the access target sector number and a memory region corresponding to the destination memory address to store a dumped result as the audit trail, when the threat occurrence in the virtual machine boot process is detected.

17. The method of claim 12, wherein the detecting the threat occurrence in the virtual machine boot process comprises detecting that BIOS interrupt hooking occurs, when a time at which the vector table change occurs is different from a time corresponding to a log of a normal boot process.

18. The method of claim 12, wherein the detecting the threat occurrence in the virtual machine boot process comprises detecting that a malicious service routine is registered due to an interrupt descriptor table hooking or a flag change, when the monitored result is different from the log of the normal boot process and the CPU register state information.

\* \* \* \* \*